United States Patent Office 3,399,244
Patented Aug. 27, 1968

3,399,244
PROCESS FOR THE ISOMERIZATION OF α-PINENE
Michel Gut, Geneva, Dietmar Lamparsky, Dubendorf, and Peter Schudel, Grut, Gossau, Switzerland, assignors to Givaudan Corporation, Delawanna, N.J., a corporation of New Jersey
No Drawing. Filed June 29, 1966, Ser. No. 561,322
Claims priority, application Switzerland, July 27, 1965, 10,629/65
6 Claims. (Cl. 260—675.5)

ABSTRACT OF THE DISCLOSURE

The contra-thermodynamic isomerization of α-pinene to β-pinene is disclosed. The process involves reacting α-pinene at temperatures within the range from about 20° C. to 100° C., with an alkali metal organic compound in which the alkali metal is directly connected to a carbon atom, and treating the reaction product with protonating agents at temperatures within the range from about —60° C. and ambient room temperature, to yield an isomerizate containing at least 30% of β-pinene.

The present invention relates to a novel method for the isomerization of α-pinene to β-pinene.

α-Pinene and β-pinene constitute the main ingredients of the turpentine oils usual in commerce, the α-pinene (which is less valuable for the odorant and polymer industries) as a rule predominating in the pinene mixtures of these turpentine oils. There consequently exists the necessity to transform α-pinene into the more valuable β-pinene.

There has now been found a process which provides this transformation in a technically advantageous manner. Thus, for example, it has become possible to transform pure α-pinene into a mixture of α- and β-pinene which contains considerably more β-pinene than corresponds to the thermodynamic equilibrium (ca. 4–6% β-pinene), namely about 30% of β-pinene.

The process for the isomerization of α-pinene into β-pinene in accordance with the invention is characterized in that α-pinene is reacted with an (alkali metal)-organic compound and the reaction product is treated with a protonating agent.

As (alkali metal)-organic compounds there come into consideration, for example, compounds of the formula Me—R, wherein Me signifies an alkali-metal atom such as lithium, sodium or potassium, and R signifies a straight-chain or branched alkyl group (e.g. one having 1–10 C-atoms such as methyl, ethyl, propyl, isopropyl, butyl, tertbutyl, amyl, hexyl, decyl) or a mono- or bicyclic aryl group (e.g. phenyl, tolyl, naphthyl).

As the protonating agent, there can, for example, be named the following proton-yielding compounds: dilute mineral acids such as dilute (e.g. 2-N) hydrochloric acid, sulphuric acid, phosphoric acid; sulphonic acids (e.g. p-toluenesulphonic acid); carboxylic acids (e.g. alkanecarboxylic acids such as acetic acid or aromatic carboxylic acid); alcohols (for example, alkanols such as methanol, ethanol); phenols; amines and ammonium compounds having at least one available hydrogen atom, for example, ammonia (liquid or gaseous), primary or secondary amines such as mono- or dialkyl amines, ammonium halides (e.g. chlorides or bromides; solid or as aqueous solution), pyridine hydrohalides; and finally water.

According to a preferred way of carrying out the process in accordance with the invention, a solution of the organo-(alkali metal) compound (e.g. amyl-sodium) is treated with α-pinene at a temperature between about —50° and +40° C., conveniently between —20° and room temperature. As solvents there especially come into consideration aliphatic or aromatic hydrocarbons such as, for example, pentane, hexane, benzene. There can, however, also be used ethers such as diethyl ether, dioxan, tetrahydro-furan.

The reaction product is then stirred for some hours (e.g. 8–16 hours) at a temperature between about 20 and 100° C., preferably at about 40° C., with partial or complete removal of the solvent. The reaction product is subsequently treated at a temperature between about —60° and room temperature with the protonating agent (for example, with ammonium chloride, ammonia, 2-N hydrochloric acid or water). For the working up, the reaction product is treated with water and the lipophilic phase (containing pinene) separated or extracted with ether. The β-pinene thus obtained can be separated from unreacted α-pinene, for example, by means of distillation.

In the following examples the temperatures are given in degrees centigrade.

EXAMPLE 11 g. of potassium (0.28 g. atom), or 6.4 g. of sodium (0.28 g. atom) are pulverised in boiling octane. The suspension is allowed to cool and then, by decanting off, the octane is replaced by 200 ml. of pentane. A solution of 10 g. (0.09 mol) of 1-chloro-pentane in 40 ml. of pentane is added dropwise at a temperature between —10 and —20° in the course of 1.5 hours with vigorous stirring to the suspension of sodium powder in pentane. The mixture is subsequently further stirred for 20 minutes at —20° and 20 minutes at 0°, and thereupon again cooled to —20°. 6.1 g. (0.045 mol) of α-pinene are then added in one pouring with stirring, the mixture is allowed slowly to come to room temperature and the reaction is completed by heating at 40–50° for 12 hours. The reaction mixture is allowed to cool, poured on a saturated ammonium chloride solution (or liquid ammonia) and, after dilution with water worked up with ether. The ether extracts are dried and the ether is evaporated off. The β-pinene obtained is gas-chromatographically identical with authentic β-pinene.

The foregoing illustrates the invention, which however, is not to be limited thereby, but is to be construed as broadly as permissible in view of the prior art and limited solely by the appended claims.

What is claimed is:
1. The process for the isomerization of α-pinene to β-piene which comprises reacting α-pinene at temperatures within the range from about 20° C. and 100° C. with an alkali metal organic compound in which the alkali metal is directly connected to carbon, and treating the reaction product at temperatures within the range from about —60° C. and ambient room temperature with a protonating agent to yield an isomerizate containing β-pinene.
2. The process according to claim 1, wherein the alkali metal organic compound is amyl sodium.
3. The process according to claim 1, wherein the alkali metal organic compound is amyl potassium.

4. The process according to claim 1, wherein the protonating agent is selected from the group consisting of aqueous ammonium chloride, solid ammonium chloride, ammonia, hydrochloric acid, sulphuric acid and phosphoric acid.

5. The process according to claim 2, wherein the protonating agent is selected from the group consisting of aqueous ammonium chloride, solid ammonium chloride, ammonia, hydrochloric acid, sulphuric acid and phosphoric acid.

6. The process according to claim 3, wherein the protonating agent is selected from the group consisting of aqueous ammonium chloride, solid ammonium chloride, ammonia, hydrochloric acid, sulphuric acid and phosphoric acid.

References Cited

UNITED STATES PATENTS

| 3,264,362 | 8/1966 | Webb | 260—675.5 |
| 3,278,623 | 10/1966 | Derfer | 260—675.5 |
| 3,325,553 | 6/1967 | Derfer | 260—675.5 |
| 3,270,084 | 10/1966 | Schriesheim | 260—683.2 |

OTHER REFERENCES

Brown and Bhatt: "Hydroboration as a Convenient Synthetic Route for Contra-thermodynamic Isomerization of Olefins," JACS 82, 2074 (Apr. 20, 1960).

DELBERT E. GANTZ, *Primary Examiner.*

G. E. SCHMITKONS, *Assistant Examiner.*